United States Patent Office 2,849,445
Patented Aug. 26, 1958

2,849,445
PROCESS FOR THE PRODUCTION OF
ALKALI CELLULOSE

William Reginald Weigham, Coventry, England, assignor to Courtaulds Limited, London, England, a British company No Drawing. Application November 12, 1953
Serial No. 391,761

Claims priority, application Great Britain
November 19, 1952

2 Claims. (Cl. 260—233)

This invention relates to a process for the production of alkali cellulose by a so-called "slurry steeping process."

In a slurry steeping process cellulose is formed into a slurry in caustic soda liquor, the alkali cellulose is continuously separated from the slurry and the expressed caustic soda liquor is collected and returned to the slurry forming stage. One form of apparatus for carrying out the slurry steeping process comprises a slurry forming receptacle, a surge tank for receiving the slurry under pressure and a slurry separation device comprising a pair of perforated rolls which are spaced apart and which rotate in opposite directions. These rolls are partly immersed in the slurry and the device is operated under such conditions that the alkali cellulose is deposited as a filter cake on the surfaces of the two rolls and is drawn up and pressed into a single slab between the two rolls while the expressed caustic soda liquor is removed through internal channels in the rolls and is returned to the slurry forming receptacle. It is desirable that the so-called "press weight ratio," that is the ratio of the weight of the pressed alkali cellulose to that of the original air-dry cellulose, of the slab should be substantially uniform.

The object of the present invention is to improve the slurry steeping process.

According to the present invention, a process for the slurry steeping of cellulose comprises forming the cellulose into a slurry in caustic soda liquor in a suitable vessel, passing the slurry continuously under pressure to two press rolls thereby separating the alkali cellulose from the slurry and returning the expressed caustic soda liquor to the slurry forming stage wherein hemi-cellulose is continuously removed from the system at such a rate that the pressure of the slurry passing to the press rolls and the press weight ratio of the alkali cellulose are maintained substantially constant for a given temperature of operation and for a given rate of production.

If the hemi-cellulose content of the caustic soda liquor is too great, the press weight ratio is adversely affected, for example a rise in the hemi-cellulose content of the caustic soda liquor will result in an increase in the press weight ratio, the percentage of cellulose in the slab of alkali cellulose leaving the slurry separation stage will decrease while the percentage of caustic soda in the slab will remain substantially the same, that is to say the cellulose/caustic soda/water ratio in the slab will be continually changing and the viscose produced from the alkali cellulose will be of poor quality. By carefully controlling the hemi-cellulose concentration in the system according to the present invention it is possible to obtain an alkali cellulose having a low press ratio, that is one within the limits of 2.75 to 3.1.

In addition to the increase in the press weight ratio with a rise in hemi-cellulose content of the caustic soda liquor, the formation of the slab itself is also deleteriously affected. With a rise in the hemi-cellulose content there is a marked tendency for the slab to crumble, comparatively large pieces of alkali cellulose break away from the slab and adhere to the roll surfaces and are carried into the caustic soda system, the amount of such alkali cellulose material breaking away from the slab can increase from 3 lb. per hour to 100 lb. per hour.

The hemi-cellulose concentration which can be tolerated in the system is dependent on the temperature at which the system is operated. For example, if a higher temperature of say 50° to 60° C. is to be used then the hemi-cellulose concentration for a given rate of production can be maintained at a higher level than if a lower temperature of say 30° to 40° C. is to be used. In order to eliminate the necessity of cooling the alkali cellulose before aging, it is generally preferred to carry out the slurry steeping at a low temperature so that the alkali cellulose slab leaving the system is at the temperature at which it is to be aged. The control of the hemi-cellulose concentration in the process of the present invention therefore enables the slurry steeping to be carried out at lower temperatures for the desired rate of production.

The slab forming property of the alkali cellulose is also dependent on the fibre length of the original cellulose, for a short fibre pulp the hemi-cellulose concentration in the caustic soda liquor must be maintained at a lower figure than for a long fibre pulp to ensure a slab of good formation.

The removal of hemi-cellulose from the system can be effected by collecting the expressed caustic soda liquor from the slurry separation, withdrawing part of the expressed caustic soda liquor and replacing it by fresh caustic soda liquor before returning the liquor to the slurry forming stage. The withdrawn caustic soda liquor contains hemi-cellulose in solution and fibres in suspension and can be treated to recover the caustic soda by dialysis or may be used after filtration as part of the dissolving charge in a subsequent cellulose xanthate dissolving stage.

The press rolls may be of any suitable construction, for example they may have internal channels communicating with circumferential grooves and the expressed liquor may be withdrawn by way of the internal channels. The circumferential grooves of the press rolls are kept clean preferably by series of cleaning fingers and the fibres removed from the grooves may be returned directly to the circulating caustic soda liquor or to the slurry forming receptacle.

The control of the hemi-cellulose content of the circulating caustic soda liquor in a slurry steeping process in accordance with the process of the present invention enables a slab of alkali cellulose to be produced continuously having a substantially constant press weight ratio and of such a consistency that it can be xanthated rapidly and easily to give a viscose of good quality. In addition the slurry steeping can be carried out for a given rate of production at a lower temperature so that the alkali cellulose slab can be passed directly to the ageing zone without an intermediate cooling zone.

The invention is illustrated by the following examples, in which the percentages are by weight.

*Example 1*

Sheets of cellulose of a long fibre spruce type pulp of normal grade as used in the production of viscose rayon staple were continuously fed into a slurry forming receptacle. A sufficient quantity of caustic soda liquor of 17.8 percent concentration was passed into the receptacle to maintain the level of the slurry substantially constant. The cellulose sheets were torn and disintegrated by blades in the receptacle and were thoroughly mixed with the caustic soda liquor to give a 3.5 percent slurry of alkali cellulose in caustic soda liquor. The rate of steeping and pressing was 17 lb. of cellulose per minute and the temperature of the slurry was 36° C. The slurry was pumped into a surge tank and was then passed to a slurry separation device having two circumferentially grooved press rolls rotating in opposite directions. The alkali cellulose adhered to the rolls and was drawn up and pressed between the nip of the rolls to form a slab of alkali cellulose. The expressed liquor was withdrawn from the rolls by way of internal channels communicating with the circumferential grooves. From the expressed caustic soda liquor 10 gallons per minute were bled off; the remaining caustic soda liquor was returned to the supply tank for the slurry forming receptacle, the supply being maintained by the addition of fresh caustic soda to the supply tank.

By bleeding off part of the expressed caustic soda liquor it was possible to operate the process continuously with a substantially uniform surge tank pressure of 10½ lb. per square inch and to obtain an alkali cellulose slab having a substantially uniform press weight ratio of 2.8. The hemi-cellulose concentration of the circulating caustic soda liquor was 0.7 percent.

*Example 2*

A process was carried out as described in Example 1 using sheets of cellulose of a high alpha-cellulose, short fibre pulp of the type used for viscose rayon tyre cord. The caustic soda concentration, the steeping and pressing rate, temperature and slurry concentration were the same as in Example 1. From the expressed caustic soda liquor 6 gallons per minute were bled off. By bleeding off part of the expressed caustic soda liquor it was possible to operate the process continuously with a surge tank pressure of 8½ lb. per square inch and a substantially uniform press weight ratio of 2.8. The hemi-cellulose concentration of the circulating caustic soda liquor remained substantially constant at 0.4 percent.

*Example 3*

A process was carried out as described in Example 1 using long fibre spruce type pulp of approximately 91% of alpha-cellulose as used in the production of viscose rayon staple. The caustic soda concentration and the preparation of the slurry was substantially the same as Example 1 but the rate of steeping and pressing was 28 lb. per minute and the temperature was 50° C. From the expressed caustic soda liquor 8 gallons per minute were bled off so permitting the process to operate continuously with a surge tank pressure of 14 lb. per square inch and a press weight ratio of 2.8 to 2.9. The hemi-cellulose concentration of the circulating caustic soda liquor remained substantially constant at 1.3%. The amount of alkali cellulose breaking from the slab and adhering to the press roll surfaces was 15 to 20 lb. per hour.

If the quantity of caustic soda bled off is reduced to permit the hemi-cellulose concentration to rise to 2.6%, the pressure in the surge tank rose to 18 lb. per square inch, the amount of alkali cellulose breaking from the slab rose to 80 to 90 lb. per hour and the press weight ratio of the alkali cellulose was 3.05.

What I claim is:

1. In a process for the continuous production of alkali cellulose of uniform composition and temperature, which comprises forming cellulose sheets into a slurry in caustic soda liquor in a slurry-forming vessel, passing the slurry into a surge tank, continuously passing the slurry from the surge tank, under pressure, to a slurry separating container in which a pair of perforated, peipherally opposed rotating press rolls are partially immersed, separating the alkali cellulose from the slurry by means of said press rolls and returning caustic liquor from which alkali cellulose has been separated from said press rolls to said slurry-forming vessel; the improvement which comprises maintaining the hemi-cellulose content of said slurry substantially constant by continuously withdrawing a portion of the caustic soda liquor from which alkali cellulose has been separated and which contains hemi-cellulose from the system and replacing it with an equivalent amount of fresh caustic soda liquor substantially free from hemi-cellulose, whereby the pressure of the slurry passing to the press rolls and the press-weight ratio of the alkali cellulose are maintained substantially constant.

2. In a process for the continuous production at a uniform rate of alkali cellulose of uniform composition and temperature in which cellulose sheets are mixed into a slurry with caustic soda liquor, the slurry is passed into a surge tank, the slurry from the surge tank, under pressure, is passed into a slurry separating container having a pair of opposed rotating press rolls therein partially immersed in the slurry, separating from the slurry a slab of alkali cellulose from which liquor has been expressed by means of the press rolls, and returning caustic soda liquor containing hemi-cellulose expressed from the slurry by means of the press rolls to the slurry-forming tank; the improvement which comprises continuously withdrawing from the system a part of the caustic soda expressed from the slurry by means of the press rolls and replacing it with fresh caustic soda liquor, the rate of withdrawal of the liquor being such as to maintain the hemi-cellulose concentration in the system substantially constant, whereby the press-weight ratio and the pressure of slurry passing to the press rolls is maintained substantially constant for a given temperature of operation and a given rate of production.

References Cited in the file of this patent

UNITED STATES PATENTS

| | | |
|---|---|---|
| 1,814,543 | Blanco et al. | July 14, 1931 |
| 1,955,092 | Richter | Apr. 17, 1934 |
| 2,392,269 | Schmitz | Jan. 1, 1946 |
| 2,621,124 | Keyser et al. | Dec. 9, 1952 |
| 2,629,715 | Robertson | Feb. 24, 1953 |

OTHER REFERENCES

Cellulose and Cellulose Derivatives, by Ott, Interscience Publications Inc., New York, page 815.